United States Patent [19]

Vikre

[11] 4,356,972

[45] Nov. 2, 1982

[54] IRRIGATION SYSTEM AND CONSTANT VOLUME SPRINKLER HEAD THEREFOR

[76] Inventor: Merle A. Vikre, 32 Windward Way, Gulf Harbors, New Port Richey, Fla. 33552

[21] Appl. No.: 199,094

[22] Filed: Oct. 20, 1980

Related U.S. Application Data

[63] Continuation of Ser. No. 69, Jan. 2, 1979, abandoned, which is a continuation-in-part of Ser. No. 765,266, Feb. 3, 1977, abandoned.

[51] Int. Cl.³ .............................................. B05B 1/32
[52] U.S. Cl. ................................ 239/177; 239/222.17
[58] Field of Search .................... 239/222.17, 383, 454, 239/506, 513, 498, 500, 533.1, 533.13, 223, 224

[56] References Cited

U.S. PATENT DOCUMENTS

| | | |
|---|---|---|
| Re. 24,534 | 9/1958 | Dahl . |
| 458,607 | 9/1891 | Weiss ............................. 239/222.17 |
| 575,417 | 1/1897 | Cyrenius ......................... 239/222.17 |
| 868,366 | 10/1907 | Scott ..................................... 169/39 |
| 1,963,424 | 6/1934 | Smith . |
| 2,389,134 | 11/1945 | Brown . |
| 2,393,328 | 1/1946 | Mahone ............................... 299/125 |
| 2,454,929 | 11/1948 | Kempton . |
| 2,460,647 | 2/1949 | Miller . |
| 2,488,234 | 11/1949 | Petry . |
| 2,728,355 | 12/1955 | Dahl ...................................... 138/45 |
| 2,775,984 | 1/1957 | Dahl ...................................... 138/45 |
| 2,878,836 | 3/1959 | Binks . |
| 2,910,093 | 10/1959 | Dahl ...................................... 138/46 |
| 3,006,558 | 10/1961 | Jacobs ............................. 239/222.17 |
| 3,014,667 | 12/1961 | McLean et al. . |
| 3,036,782 | 5/1962 | Windsor . |
| 3,077,903 | 2/1963 | Honsinger ............................. 138/45 |
| 3,121,445 | 2/1964 | Wisniewski . |
| 3,138,177 | 6/1964 | Cutler . |
| 3,141,477 | 7/1964 | Campbell et al. . |
| 3,592,237 | 7/1971 | Borschers ............................. 138/43 |
| 3,630,236 | 12/1971 | Diggs .................................... 138/45 |
| 3,667,673 | 6/1972 | Knudsen ................................. 239/1 |
| 3,779,462 | 12/1973 | Bruninga ............................. 239/230 |
| 3,782,637 | 1/1974 | Crumpacker ...................... 239/232 |
| 3,833,819 | 9/1974 | Diggs .................................... 138/45 |
| 3,837,363 | 9/1974 | Meronek ......................... 239/533.13 |
| 3,908,694 | 9/1975 | Spears ................................ 239/542 |
| 3,951,379 | 4/1976 | Cornelius ........................... 251/118 |
| 4,059,228 | 11/1977 | Werner .............................. 239/106 |
| 4,091,996 | 5/1978 | Nelson ......................... 239/533.14 |

FOREIGN PATENT DOCUMENTS

| | | | |
|---|---|---|---|
| 586135 | 3/1925 | France ............................ 239/222.17 |
| 1342023 | 10/1963 | France ............................... 239/515 |
| 1492784 | 7/1963 | France ............................... 239/524 |
| 103160 | 6/1962 | Netherlands ...................... 239/383 |
| 146688 | 7/1920 | United Kingdom .............. 239/515 |
| 471273 | 9/1937 | United Kingdom .............. 239/382 |
| 127108 | 4/1959 | U.S.S.R. ....................... 239/DIG. 1 |

*Primary Examiner*—James B. Marbert
*Attorney, Agent, or Firm*—Merchant, Gould, Smith, Edell, Welter & Schmidt

[57] ABSTRACT

The disclosure is directed to a center pivot irrigation system capable of operation under high or low water pressure and a constant volume sprinkler head therefor, which together provide uniform water distribution over an agricultural field notwithstanding the presence of hills and valleys in the field, pressure fluctuations of the water source, friction losses or the direction or magnitude of the wind. The system employs a plurality of sprinkler heads each of which provides a constant volume of water to the annular area over which it travels. Because the annular areas increase in size and total water requirements with increasing distance from the center pivot, the water delivering capacity of each sprinkler head is chosen as a direct function of its radial distance from the center pivot, thus insuring the same water distribution to all points on the field. Each sprinkler head is designed to produce a widespread circular spray pattern that efficiently distributes the proper volume of water over its associated area with minimal losses to evaporation. This is accomplished by creating an upward jet of water that impinges on a water dispersion wheel, causing the wheel to rotate and throw the water radially outward. The undersurface of the wheel has two sets of water distributing grooves that create a dual circular spray pattern that uniformly distributes water over the associated flow area.

38 Claims, 11 Drawing Figures

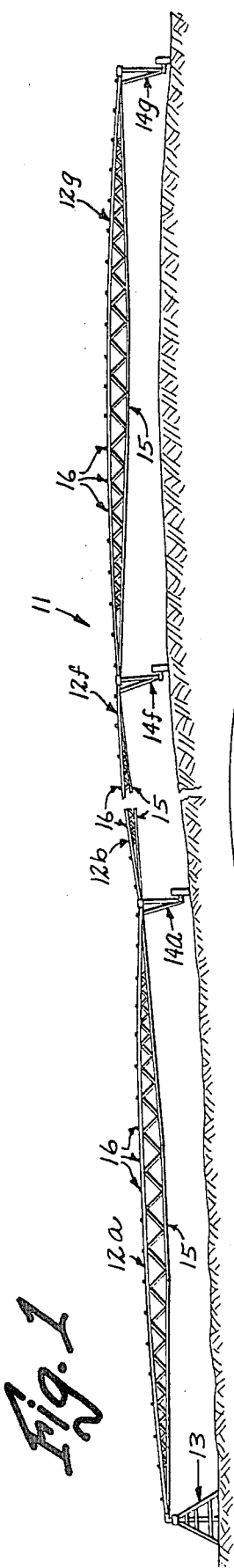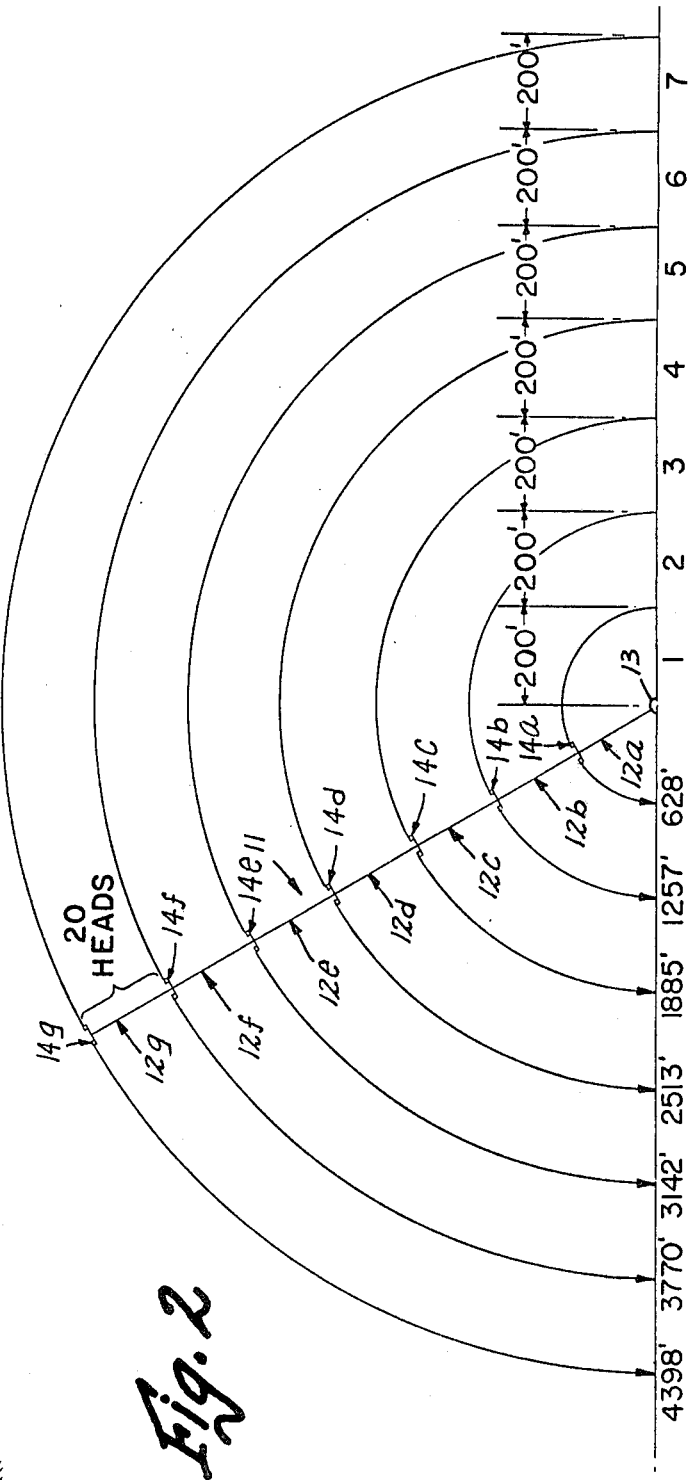

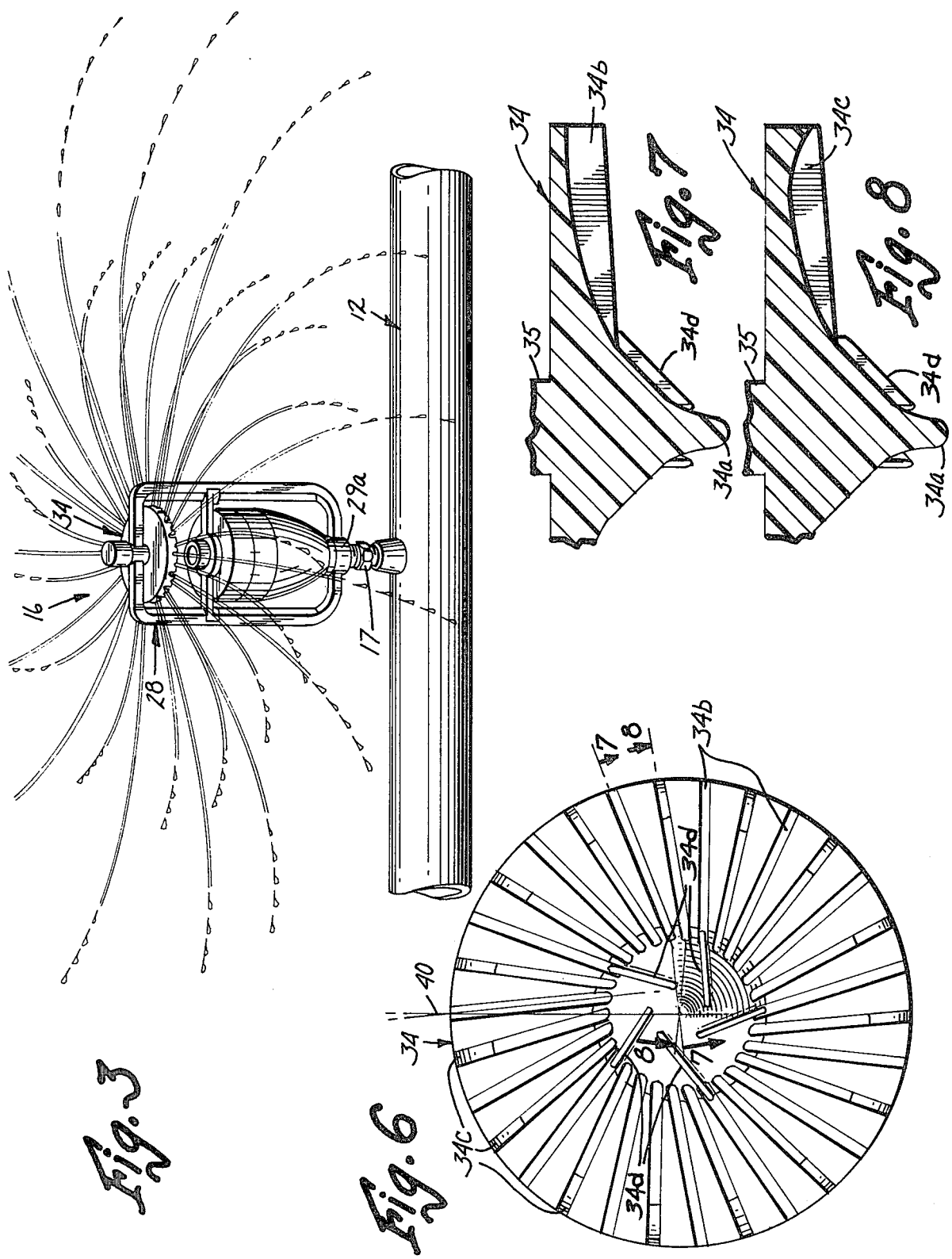

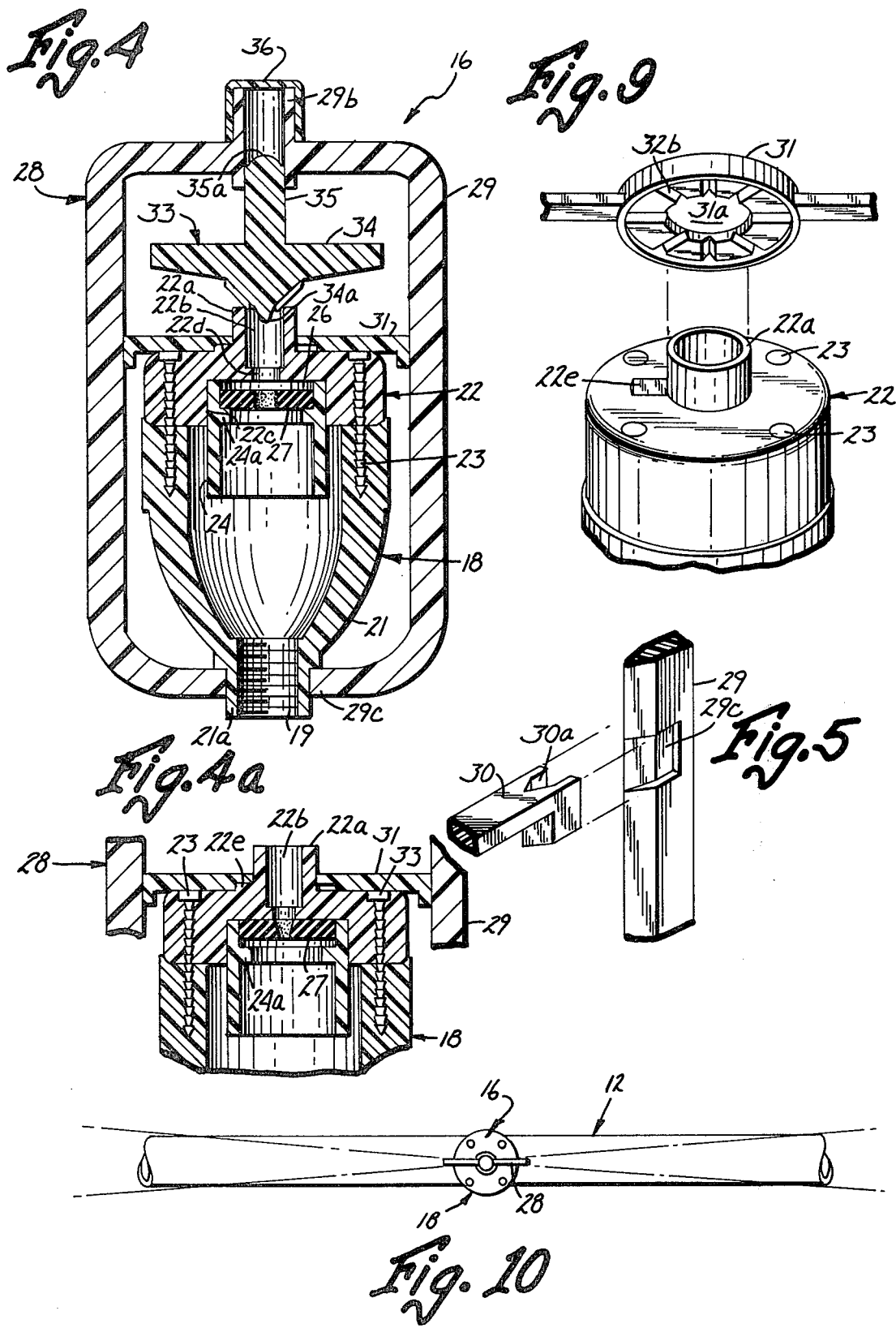

IRRIGATION SYSTEM AND CONSTANT VOLUME SPRINKLER HEAD THEREFOR

This is a continuation application, under 37 GFR 1.60, of pending prior application Ser. No. 000,069, filed on Jan. 2, 1979 now abandoned, for "Irrigation System and Constant Volume Sprinkler Head Therefor", which is a continuation-in-part of application Ser. No. 765,266, filed Feb. 3, 1977, now abandoned.

BACKGROUND OF THE INVENTION

The invention is generally related to water distributing systems and devices, and is specifically directed to a center-pivot, field irrigation system capable of operating at low or high water pressure, and a constant-volume sprinkler head for such irrigation systems.

Center-pivot irrigation systems typically comprise an extremely long water conduit "arm", which is pivotally connected at one end to a source of water under pressure. The conduit arm is carried in an elevated position, usually by a plurality of radially spaced wheeled towers which are powered by hydraulic, pneumatic or electrical motors to rotatably sweep the conduit arm through and over a circular field. The conduit arm includes a predetermined number of water sprinkling heads, which are radially spaced over its length and constructed to distribute a spray of water on the circular or annular field area over which they pass.

Center-pivot irrigation systems have strongly and successfully established themselves in the farming community. Although initially expensive, they presently represent one of the most efficient manners of irrigation, insuring that most of the crop receives an adequate supply of water and thus increasing crop yield.

For some period of time, center-pivot irrigation systems have operated at reasonably high water pressure, typically on the order of 70 psi. This has been environmentally and economically unsound, since such levels of operation require more elaborate pumping equipment, as well as conduit and sprinkler heads capable of withstanding such pressures. High pressure equipment is more expensive to operate due to fuel consumption. Further, the extreme pressure causes substantial evaporation of the water for at least two reasons. First, the water is often propelled through the air for significant distances where higher pressures are used, and the more exposure to the air, particularly when it is dry, the greater the degree of evaporation. Secondly, irrigation systems of this type often create a spray by directing a high velocity water jet against a deflector. The resulting spray is a fine mist, at least in part, which is highly subject to evaporation before it reaches the ground, and the problem is severely compounded by windy conditions, which also tend to blow the spray away from the intended area.

Consequently, many of the newer systems have been designed to operate at low water pressure, typically on the order of 20 psi. Lower pressures clearly have the advantage of less operating cost, and there is usually less evaporation under still conditions. However, evaporation and misdirection of the spray pattern have continued to be a problem under windy conditions, resulting in erratic and nonuniform distribution of water over the field. Nonuniform distribution is even more pronounced where differences in elevation occur in the field even where such differences are not great. A severe pressure drop occurs wherever there is any degree of elevational difference in the conduit arm. This results in poor water distribution in the high areas of the field, whereas over watering occurs in the low spots. Thus, the field becomes "spotted" with areas which have received too little or too much irrigation, and much or all of the advantage of low pressure irrigation is lost. This is not, of course, conducive to optimum crop yield.

The inventive irrigation system and sprinkler head therefore are the result of an endeavor to develop a low pressure center-pivot system capable of uniformly distributing water over the field notwithstanding differences in elevation or windy conditions, and that overcomes high percentage water losses due to evaporation.

The irrigation system comprises an elevated conduit arm that is pivotally connected to a stationary point (usually the well pipe), and is powered to rotatably sweep through and over the field. The system further comprises a plurality of sprinkler heads spaced over the length of the conduit arm, each of which is constructed to create a spray formed from water droplets that are large enough to resist being blown off course by the wind, but not so large as to damage farm plants that may be small and fragile after sprouting and during early development.

Because the area of a circular field increases exponentially as the field radius increases, the system must be properly designed to insure that the sprinkler heads have the capacity to cover the entire field with a sufficient volume of water, and that this predetermined volume is uniformly distributed even without elevation differences or windy conditions. Thus, assuming that the sprinkler heads are equidistantly spaced, each successive head in the radially outward direction generally must have a greater output capacity since the annular area which it overlies is greater than the annular area which next precedes it. Stated otherwise, although the annular band width of all sprinkler head areas may be essentially constant with equidistant spacing, each successive area nevertheless increases appreciably because its effective radius increases. Accordingly, the output capacity of each sprinkler head must be chosen to deliver the proper volume of water per unit of time based on the specific area which it overlies and serves.

Althrough I prefer increasing the output capacity of successive sprinkler heads as a function of their radial distance from the pivot point, it would be possible to use sprinkler heads of the same output capacity and decrease the spacing therebetween as a function of increasing radial distance from the pivot point. Because the output capacity of my unique sprinkler head can be varied much more easily (due to interchangeability of control components) than can sprinkler head spacing on the conduit arm, the equidistant spacing approach is strongly preferred. This is particularly so since proper water distribution is necessarily conditioned on geographic area, annual rainfall, type of crop and the like. Further, many existing systems already have equidistantly spaced sprinkler heads but can be readily converted to the inventive system.

Having designed the system to be capable of uniform and sufficient water distribution over the entire field, the problem of pressure fluctuations due to differences in elevation can be overcome on an individual sprinkler head basis. This is accomplished through the use of a volume control device within the sprinkler head that maintains a constant volume output even in the face of water pressure fluctuations in the conduit arm. Thus, assuming that water under a predetermined minimum pressure of sufficient volume is always supplied to the conduit arm, the individual sprinkler heads respond to the delivered pressure and distribute the same volume of water in the same spray pattern throughout all phases of the operation.

The inventive sprinkler head herein disclosed utilizes a rotatable dispersion wheel to create a circular spray pattern of substantial circumference that uniformly covers the area below with a minimum of water loss due to evaporation and being blown off course by strong wind. This is accomplished by providing means for creating an upward jet of water within each sprinkler head, and causing the jet of water to impinge on the water dispersion wheel. The dispersion wheel is constructed for rotation about a substantially vertical axis, and its impinged undersurface is provided with a plurality of ribs and grooves that cause the water to flow substantially radially outward. The ribs and grooves are relatively disposed so that water first strikes the ribs and then enters the grooves. Both the ribs and grooves are angled slightly relative to a radius of the wheel, producing a slight pinwheel effect. Accordingly, as water impinges on the wheel undersurface, it strikes the slighly angled side of the ribs and grooves, producing a tangential component that is multiplied by the number of ribs and grooves on the wheel. This causes the dispersion wheel to rotate, throwing the water radially outward in droplet form.

In the preferred embodiment, two sets of alternating grooves are formed in the undersurface of the dispersing wheel. One set of grooves disperses the water slightly upward from horizontal, generating a circular spray pattern of substantial diameter. The second set of grooves directs the water outward and somewhat downward from horizontal in a smaller circular spray pattern that is concentric with the first. The dual spray pattern results in uniform distribution of water over the associated annular land area. This water distribution is efficient because of the substantial size of the spray pattern coupled with the creation of small water droplets that are sufficiently heavy to avoid evaporation, as is the case with spray heads that produce a mist, but not so large as to damage the crop. This efficiency of distribution, coupled with operation at relatively low water pressure, results in conservation of energy as well as reduced usage of water in obtaining optimum results.

I have found that the inventive low pressure, center-pivot irrigation system employing the unique sprinkler head successfully combats the problem of uneven water distribution and spotty crop production due to differences in elevation, windy conditions, friction loss and water evaporation. Further, since the sprinkler head is designed with component interchangeability in mind, an irrigation system can be custom designed to the conditions of a specific field with very little difficulty.

The inventive irrigation system and sprinkler head include a number of additional advantageous structural features, which will become apparent from the drawings and description below.

BRIEF DESCRIPTION OF THE DRAWINGS

FIG. 1 is a fragmentary view in side elevation of a low pressure, center-pivot irrigation system embodying the inventive concept;

FIG. 2 is a schematic and graphic representation of the irrigation system and one-half of the field which the system irrigates;

FIG. 3 is a fragmentary perspective view of a single inventive sprinkler head in operation;

FIG. 4 is an enlarged sectional view of the sprinkler head;

FIG. 4a is a fragmentary sectional view similar to FIG. 4 with the volume control member in the operative state;

FIG. 5 is an enlarged, fragmentary sectional view showing a part of the sprinkler head external frame;

FIG. 6 is an enlarged view in bottom plan of the sprinkler head water dispersing wheel;

FIG. 7 is a fragmentary sectional view of the dispersing wheel taken along the line 7—7 of FIG. 6;

FIG. 8 is a fragmentary sectional view of the dispersing wheel taken along the line 8—8 of FIG. 6;

FIG. 9 is a fragmentary exploded perspective view of portions of the sprinkler head, showing an adjustable feature which minimizes water loss; and FIG. 10 is a fragmentary view in top plan of the irrigation system conduit arm and a single sprinkler head adjusted to an optimum position.

DESCRIPTION OF THE PREFERRED EMBODIMENTS

With initial reference to FIG. 1, a center-pivot irrigation system constructed for operation at low water pressures is represented generally by the numeral 11. Irrigation system 11 consists of an extremely long water conduit "arm", which is made up of a plurality of conduit sections 12a-12g which are serially connected to permit the flow of water over the entire length. One end of the conduit arm is pivotally connected to a source of water under pressure, such as a well pipe, and this connection is generally designated 13 in FIG. 1. The conduit arm is carried in an elevated position by a plurality of wheeled "towers" 14a-14g, the towers being disposed at the interconnection points of the conduit sections 12a-12g as shown. As such, there are the same number of towers as conduit sections; thus providing adequate support for the entire length of the water conduit arm. Supportive structure for each of the conduit sections 12a-12g is generally designated 15 in FIG. 1.

As is well known in the art, the wheeled towers 14a-14g are motivated hydraulically, pneumatically or electrically in a coordinated manner so that the conduit arm rotatably sweeps through and over a field relative to the center pivot 13.

Each of the conduit sections 12a-12g includes a plurality of water sprinkling or spray heads 16 which are equidistantly spaced over the entire length of the water conduit arm. With additional reference to FIG. 2, it will be seen that the irrigation system 11 is designed to irrigate a circular field having a diameter of 2800 feet, which is approximately ½ mile. Thus, the water conduit arm has a radial length of 1400 feet, and each of the 7 conduit sections 12a-12g is 200 feet. long and includes 20 equidistantly spaced spray heads 16 to distribute water over its associated annular area. Thus, this particular irrigation system includes 140 spray heads which are designed to deliver a predetermined volume of water as described in further detail below. It will be appreciated to the person of ordinary skill that this irrigation system is exemplary, and it is possible for the system to be of varying lengths, depending on the field size, with varying numbers of conduit sections. The irrigation system may also include a greater or lesser number of spray heads having different volume flow capabilities, the objective being to distribute a predetermined volume of water onto the field in a given amount of time as uniformly as possible.

As shown in FIG. 2, the circumferential distance traveled by each spray head varies significantly based on its radial distance from the center pivot 13. The figures extending radially outward to the left in FIG. 2 represent the circumferential distances traveled by the respective towers 14a–14g as they move through the field. As an exemplary comparison, the outermost tower 14g travels approximately 4398 feet in one revolution of the conduit arm, whereas the innermost tower 14a travels only 628 feet through the same revolution. Thus, the tower 14g travels seven times the distance traveled by tower 14a, and a comparison of the volume of water distributed by a spray head 16 proximate the tower 14g and one proximate the tower 14a must reflect the difference in travel. Generally, where the spray heads 16 are equidistantly spaced over the length of the conduit arm, as with the irrigation system 11, the water distributing capacity of a given spray head must be established as a function of its radial distance from the center pivot 13. In the preferred embodiment, each spray head 16 has a water distributing capacity which is directly related to the distance it travels and the annular area which it irrigates; and its capacity in this respect is therefore greater than the spray head 16 which is radially inboard and less than that of the spray head 16 which is next radially outboard. It may also be possible to arrange the spray head 16 in groups or sets of two or three having the same water distributing capacity, with the set capacity increasing as a function of radial distance from the center pivot.

Where each spray head 16 has a different water distributing capacity, as in the preferred embodiment, I also prefer to identify each one with some type of symbol which is visually discernible at a distance. Thus, with reference to FIG. 3, the spray head 16 shown in side elevation includes the numeral "1", which quickly identifies it as the first or innermost spray head 16 in the conduit arm. Of course, the spray head identification may vary from system to system. For example, rather than a progressing continuous number sequence, it may be desirable to also identify the spray head by a letter which corresponds to the particular conduit section to which it belongs; e.g., A-1, 2, 3 . . . 20; B-1, 2, 3 . . . 20, etc. The objective of spray head identification is that the user be capable of quickly identifying the specific position of a specific spray head simply by observation. This is highly important where the system is custom designed to a particular field, and the agricultural user is not well versed on water distributing capacity in terms of outlet orifice sizes, inlet pressures, volume control rates and the like.

FIGS. 3–10 disclose the specific construction of a spray head 16 which is uniform throughout the system, with the exception that some of the components are interchangeable to vary the water distributing capacity.

Each spray head 16 is connected directly to its associated section of the water conduit arm for fluid communication therewith. This is accomplished through the use of a threaded adapter 17 that is commonly screwed into the conduit section and into the lower housing of the spray head 16 (FIG. 3).

With additional reference to FIG. 4, each of the spray heads 16 comprises an enclosed bowl 18, the lower end of which defines an internally threaded inlet 19 that receives the threaded adapter 17 and serves as an inlet to water received from one of the associated conduit sections 12a–12g.

The enclosed bowl 18 is a two-piece fabrication, comprising a lower bowl section 21 and a cover 22. In the permanently assembled state shown in FIG. 4, the numbers 21, 22 are ultrasonically welded at the common annular contact surface, and to insure a tight, leakproof fit, four barbed nails 23 are inserted in circumferential spaced relation. In the preferred embodiment, the lower bowl section 21 and cover 22 are molded from high density plastic, and the barbed nails 23 are inserted at an elevated temperature, permitting them to be driven in easily while offering a secure connection after cooling.

As is shown in FIG. 4, the enclosed bowl 18 is generally symmetrical and defines an axis which is vertically disposed in the figure. The threaded inlet 19 is formed in the lower bowl section 21. The upper face of the cover 22 is formed with an integral cylindrical projection 22a through which an outlet 22b extends. A counter bore 22c of substantially greater diameter than the outlet 22b extends upwardly from the bottom face of cover 22. The outlet 22b and counter bore 22c are in axial alignment with the threaded inlet 19. The outlet 22b is of smaller diameter than the inlet 19, whereas the counter bore 22c is greater in diameter.

A cylindrical member 24 has an outside diameter corresponding to the inside diameter of counter bore 22c, and its upper end is inserted into the counter bore 22c as shown in FIG. 4 and ultrasonically welded. The lower end of cylindrical member 24 projects downward toward the threaded inlet 19 in axial alignment therewith. The outer surface of the lower free end of cylindrical member 24 is spaced from the inner cylindrical surface of the lower bowl section 21 to define an annular space 25 therebetween, the purpose of which is discussed below.

The cylindrical member 24 is formed with an annular rim 24a that projects radially inward from its inner cylindrical surface. The annular rim 24a is axially spaced from the flat counter bore surface to define an annular recess 26. A resilient, annular washer 27 having an outside diameter generally corresponding to the inside diameter of the cylindrical member 24 is placed on top of the rim 24a during assembly, and is retained in the annular recess 26 in the assembled state. As is shown in FIG. 4, the thickness of resilient washer 27 is less than the axial diameter of the annular recess 26, permitting a degree of vertical movement of the washer 27 in the recess 26.

With continued reference to FIG. 4, a small annular rim 22d is disposed at the base of outlet 22b adjacent the counter bore 22c, and is engageable by the resilient washer 27 when it is moved upwardly in the recess 26 by water pressure. The minor diameter of annular washer 27 is slightly smaller than the diameter of rim 22d. As such, the resilient washer 27 serves as a control element to maintain water leaving the outlet 22b at an essentially constant volume notwithstanding fluctuations of water pressure within the water conduit arm.

More specifically, and with additional reference to FIG. 4a, water entering the threaded inlet 19 generally takes the form of a water jet. It enters the lower open end of the cylindrical member 24 and strikes the bottom surface of washer 27. The washer 27 is designed to resiliently deform over a predetermined range of pressures. In the lower range, the washer 27 maintains its normal form, with the minor diameter substantially the same over the washer thickness. Accordingly, the washer 27 presents a control opening to the inlet water which is of maximum size to permit the greatest volume of water to pass therethrough. However, at the higher end of the pressure range, the washer 27 deforms relative to the rim 22d, as shown in FIG. 4a, and the control opening of the washer 27 becomes more and more restrictive on the inlet side. This has the effect of restricting the volume of water passing through and into the outlet 22b. However, the volume of water is essentially the same since the pressure is decreased to deliver the same amount of water through the smaller passage.

Between the lowest and highest pressures, the resilient washer 27 deforms in a modulating manner so that the proper volume of flow always leaves the outlet 22b.

The annular space 25 between the outer surface of cylindrical projection 24 and the inner surface of the bowl 18 is dead ended. As such, it captures air at the time water initially enters the inlet 19, and the air is compressed as the water moves upwardly. This compressed air serves as a shock absorber to rapid pressure fluctuations within the water conduit arm, thus preventing water vibration. Although each of the annular shock absorbing recesses 25 is relatively small, the overall cushioning effect is significant because of the substantial number of spray heads 16.

As pointed out above, the enclosed bowl 18 of each spray head 16 is rigidly and immovably secured to one of the conduit sections 12a–12g by the adapter 17. Each spray head 16 also consists of an external frame which bears the general reference numeral 28. The external frame 28, which is shown in FIGS. 3–5, comprises a rectangular frame member 29 and a cross arm 30.

Rectangular frame member 29 is symmetrical in configuration and of a single piece construction, defining opposed sides, an upper cross member and a lower cross member. An annular collar 29a is integrally formed in the lower cross member, and a smaller annular collar 29b is formed in the upper cross member in axial alignment with the collar 29a. As shown in FIG. 4, annular collar 29b projects both above and below the upper cross member of frame member 29, whereas the collar 29a is of the same axial thickness as the lower cross member.

As best shown in FIG. 4, the lower end of lower bowl section 21 defines a cylindrical projection 21a which is supportably inserted into the collar 29a. Projection 21a is sized relative to the collar 29a to permit frictional rotation of the frame 28 relative to enclosed bowl 18.

Cross arm 30 comprises a single strut which is bifurcated at each end, as shown at 30a in FIG. 5. An appropriate notch 29c is formed in each side member of frame member 29 to receive the bifurcated end 30a. These members are ultrasonically welded together in the assembled state.

Cross arm 30 further comprises an integrally formed central hub 31 (FIG. 9) having an opening 31a sized to receive the upward cylindrical projection 22a of enclosed bowl 18. This size relationship is also chosen to permit restricted rotation of the cross arm 30 relative to the enclosed bowl 18.

As shown in FIG. 9, a small boss 22c of triangular cross section is formed on the top of cover 22, extending radially outward from the projection 22a a short distance. The underside of hub 31 defines a shallow annular recess, and eight V-shaped grooves 32b corresponding to the shape of the boss 22e are radially disposed in the recessed portion of hub 31 in a position to receive the boss 22e.

As described above, the enclosed bowl 18 is rigidly and immovably secured to the associated conduit arm by the threaded adapter 17. However, the external frame 28 may be rotated relative to the enclosed bowl 18 because of the relationship of the lower projection 21a and collar 29a and the upper projection 22a and hub 31. Further, due to the relationship of the boss 22e and V-shaped grooves 32b, the external frame 28 may be selectively retained in any of eight equiangularly spaced positions. The cross arm 30 is constructed with a degree of resilience, which permits the hub 31 to be vertically deflected as the external frame 28 is rotated.

The purpose of the frame rotation and selective positioning is to enable the external frame 28 to be aligned with the conduit arm 12, as is shown in FIG. 10. This minimizes the effect of the conduit arm 12 and frame 28 on the circular water flow pattern generated by each spray head 16. Because the conduit arm 12 underlies each of the spray heads 16, the arm itself acts as an obstruction to the water flow pattern since some of the falling water must hit the pipe at diametrically opposed points. Similarly, the external frame 28 of each spray head 16 presents an obstruction to the circular water flow pattern at diametrically opposed points. With the frame 28 aligned with the conduit arm 12, the obstructions of frame 28 are superimposed on those of the conduit arm 12, thus minimizing the effect on the circular flow pattern.

With reference to FIG. 5, each of the sides of frame 28 has an inner edge that tapers to a point. This serves to split the flow of water, as shown in FIG. 10, further minimizing the effect of the frame 28 on the circular flow pattern.

The circular flow pattern is generated by a dispersion wheel 33 that is shown in FIGS. 3–4 and 6–8. Dispersion wheel 33 comprises a generally disc-shaped wheel member 34 and an integral axial shaft 35. The upper surface of wheel member 34 is planar. The bottom surface tapers axisymmetrically to a central rounded point 34a. The surface flares upwardly and outwardly from the point 34a until reaching a shallow taper at the peripheral edge (FIG. 4).

With specific reference to FIGS. 6–8, two sets of grooves 34b, 34c are formed in the undersurface of wheel member 34. Each of the grooves 34b, 34c extends from an intermediate point on the undersurface to the periphery of the wheel member 34 in a generally radial manner. However, as specifically shown by the reference diameter 40 in FIG. 6, the grooves 34b, 34c do not lie precisely on radii of the wheel member 34. Rather, each groove, although straight, is angled slightly from a radius of the wheel member 34, and such angling is uniform to produce a slight pinwheel effect.

With continuing reference to FIGS. 6–8, the undersurface of wheel member 34 is provided with a plurality of ribs 34d extend generally outward from the rounded point 34a to the sets of grooves 34b, 34c. Each of the ribs 34d is straight in the preferred embodiment but is disposed at a more severe angle relative to a radius of the wheel member 34 than are the grooves 34b, 34c.

As best shown in FIGS. 7 and 8, each of the ribs 34d projects from the undersurface of wheel member 34, which permits it to function as a vane to the water which impinges on the wheel undersurface.

FIG. 6 shows the preferred embodiment to include five such ribs 34b, which are equiangularly spaced in the intermediate region between the rounded point 34a and the grooves 34b, 34c. As constructed, the ribs 34d and grooves 34b, 34c together cause the dispersion wheel 34 to be rotated by the jet of water leaving outlet 22b, as described in further detail below.

With reference to FIG. 7, the base of each groove 34b defines a smooth curve that extends upwardly and outwardly until, at the point that it opens onto the periphery of wheel member 34, it approximates being horizontal. Accordingly, water moving through the grooves 34b flows upwardly and outwardly, and as it leaves each groove 34b it is directed slightly upward and horizontally outward.

In contrast, and with reference to FIG. 8, the base of each of the grooves 34c extends upward and outward along a smooth continuous curve, but as it approaches the peripheral edge of wheel member 34, it curves downward. Accordingly, water received in the grooves 34c flows upwardly and outwardly, but as it leaves the wheel member 34 it is directed downward as well as outward.

Again referring to FIG. 6, it will be observed that the grooves 34b, 34c are disposed in an alternating manner. Further, although the outlets of the grooves 34b, 34c are spaced apart at the peripheral edge of wheel member 34, the inlets are disposed sidebyside and equidistant from the point 34a, thus defining a circle. Since the groove inlets are side-by-side, virtually all of the water received from the outlet 22b is received by and directed through the grooves 34b, 34c.

With reference to FIG. 4, the shaft 35 of dispersion wheel 33 projects axially upward and is received by the upper annular collar 29b. The size relationship of these two members is chosen so that the collar 29b acts as an axial guide to the shaft 35 as the dispersion wheel 33 moves vertically up and down. At the same time, collar 29b acts as a bearing to the shaft 35 as the dispersion wheel 33 is rotated under the influence of the water jet moving through the grooves 34b, 34c. To assist in this rotation, a cap 36 of low friction material fits over the top of annular collar 29b, and the upper end of shaft 35 is domed as shown in 35a. The axial length of shaft 35 is greater than the corresponding length of collar 29b, so that the upper end 35a engages the cap 36 when the dispersion wheel 33 is in its upper position.

Shaft 35 is sufficiently long to permit the dispersion wheel 33 to drop by gravity to a position engageably covering the outlet 22b (FIG. 4) when the device is not in operation (i.e., when there is no water pressure). This feature prevents dirt, insects and other matter from entering the outlet 22b during periods of nonuse, and subsequently clogging the output of the device. Normal operating water pressure forces the dispersion wheel 33 upward into the position shown in FIG. 3, and it is maintained in this operating position as long as the water jet from outlet 22b continues.

Under the influence of water pressure, the water jet emanating from outlet 22b forces the dispersion wheel 33 upward until the domed top 35a engages the cap 36. The jet of water strikes the tip 34a and is evenly distributed upward and radially outward into the grooves 34b, 34c. In moving radially outward, the water first strikes the angled side of each of the ribs 34d, creating a tangential force component that is multiplied by the number of ribs. The water thereafter flows into the respective grooves 34b, 34c which, because they are slightly angled, also produce a tangential force component that is multiplied by the number of grooves. This causes the dispersion wheel to rotate clockwise as viewed in FIG. 6, or counterclockwise as viewed from the top of the device, as shown in FIG. 3.

The ribs 34d are included in the preferred embodiment to assist the grooves 34b, 34c in rotating the dispersion wheel 34. However, the ribs 34d may not be necessary under some circumstances; e.g., where the magnitude of water pressure in a given system is sufficiently high to impart the necessary degree of rotation to the dispersion wheel 34. Thus, it is possible for the dispersion wheel 34 to operate successfully under some conditions with only the grooves 34b, 34c, and without the ribs 34d.

As the dispersion wheel 33 rotates, water in the grooves 34b, 34c is thrown circumferentially, creating a dual pattern due to curvature of the respective groove bases, as described above. As shown in FIG. 3, the grooves 34b create an upper flow pattern in which each water stream initially begins a path slightly upward from horizontal but then falls due to gravity. The grooves 34c create a lower flow pattern in which each water stream is directed outward and slightly downward of horizontal and then begins falling due to gravity.

The dual pattern effects uniform water distribution over the ground immediately below the spray head 16. This is accomplished because the upper flow pattern throws water radially outward farther than the lower flow pattern, with the lower flow pattern filling in the area between. Further, the rotational speed of the dispersion wheel 33 and the size of the grooves 34b, 34c create a spray of water droplets that are large enough to resist being blown off course by the wind, but not so large as to damage the crop of the field. As constructed, each spray head 16 uniformly distributes a substantially constant volume of water on the crop over which it passes with a minimum loss of water due to evaporation or blowing by the wind.

Preferably, the irrigation system 11 is custom designed to the field through the appropriate selection of spray heads 16 to accomplish the objective of uniform water distribution in the proper amount. As pointed out above, the water distributing capacity of the spray heads 16 generally increases as a function of radial distance from the center pivot. However, this is not necessarily a linear relationship. For example, if the field to be irrigated includes areas of appreciable difference in elevation, it may be desired to provide spray heads 16 capable of delivering greater volumes of water in the higher areas, and spray heads 16 capable of delivering lesser volumes of water for the lower areas. This of course would take into account the anticipated water runoff from the higher to lower areas.

Uniform construction and component interchangeability of the spray heads 16 is advantageous in this regard. The water distributing capacity of the spray head 16 is determined by the size of the passage in the resilient washer 27 as well as the size of outlet 22b. These components may be interchanged during assembly to achieve a desired water distributing capacity of a spray head 16, although each spray head 16 is otherwise identical in construction. In the preferred embodiment, the cover 22 is provided with indicia indicating the water distributing capacity of the spray head.

In operation, water is supplied to the irrigation system 11 at the center pivot 13 at a relatively low pressure, preferably on the order of 30 psi. The system is designed for a minimal pressure drop from the center to the outermost point in the conduit arm with the system on flat ground. Stated otherwise, essentially uniform pressure appears at each of the spray heads 16 where there is no difference in elevation over the length of the conduit arm. Thus, when differences in elevation appear, such as between the towers 14a and 14f of FIG. 1, the resilient washer 27 of each spray head 16 will deform appropriately to maintain a constant volume of water from the outlet 22b. This insures that the proper amount of water falls on the annular area which a particular spray head 16 overlies.

The dispersion wheel 33 insures that the constant volume of water is uniformly and efficiently distributed. As described, each of the spray heads 16 is capable of delivering a dual spray pattern of approximately 40 feet in diameter when operating at 30 psi and with the spray head 12 feet above the ground. Efficiency of the spray head 16 results from the dispersion wheel, which throws droplets of water in a wide flow pattern without misting or fogging, thus avoiding excessive evaporation of the water before it reaches the ground. With less evaporation, less water is needed, which conserves energy as well as water.

The system will operate under high as well as low water pressures without wasting water, but low pressure operation is preferred because it consumes less energy while effecting substantially the same results.

What is claimed is:

1. A spray head device for distributing a spray of water, comprising:
    (a) enclosed housing means defining an internal chamber, a fluid inlet adapted for connection to a source of water for receiving water into the chamber, and an outlet constructed and arranged to issue a jet of water therefrom, the transverse dimension of the internal chamber being large in comparison with the transverse dimension of the inlet and outlet;
    (b) volume control means disposed in the internal chamber for controlling the jet of water so that the volume output from the outlet is substantially constant;
    (c) a wall member projecting internally into the chamber from the housing outlet in encircling relation thereto and in general alignment therewith, the wall member defining an open free end through which water is received from the inlet, said wall member at its free end having an internal transverse dimension larger than the transverse dimension of said inlet and outlet, and said wall member being spaced from the internal wall of the internal chamber to define a dead ended annular space therwith in which air may be caught to act as a shock absorbing cushion to incoming water;
    (d) dispersing wheel means disposed for impingement by the jet of water and constructed to disperse the water outward into a substantially circular flow pattern;
    (e) frame means carried by the housing means for carrying the dispersing wheel means in overlying relation to the outlet;
    (f) the frame means comprising opposed side members interconnected by a top member that carries the dispersing wheel means, the side members having inner longitudinal edges that taper to a point, whereby obstruction of the circular flow pattern is minimized.

2. The device defined by claim 1, wherein the housing means is constructed to issue the jet of water vertically upward, and the jet of water is dispersed laterally outward into said circular spray pattern.

3. The device defined by claim 1, wherein the dispersing wheel means is carried by the frame means for movement relative to the outlet between a first position protectively covering the outlet and a second position spaced from the outlet in which the circular spray pattern is created.

4. The device defined by claim 3, wherein the dispersing wheel means is movable from the first position to and maintained in the second position by said jet of water, and returnable to the first position in the absence of said jet of water under the influence of gravity.

5. The device defined by claim 4, wherein the dispersing wheel means comprises a rotatable shaft member carried for sliding movement by the frame means between the first and second positions.

6. The device defined by claim 1, wherein the frame means is rotatable relative to the housing means, and further comprising means for selectively retaining the frame means in a specific position relative to the housing means.

7. The device defined by claim 6, wherein the frame means comprises opposed side members interconnected by top and bottom members and an intermediate cross arm, the housing means being carried between the cross arm bottom member, and the dispersing wheel means being rotatably carried by the top member.

8. The device defined by claim 1 wherein the volume control means comprises a resilient washer retained within the internal chamber and having a control opening disposed in alignment with the outlet, the resilient washer having a normal unstressed state in which the control opening permits the flow of a maximum volume of water, and a range of stress states in which the control opening becomes progressively restrictive, the resilient washer being disposed within the internal chamber so that incoming water from the inlet acts on and stresses the water as a function of water pressure.

9. The device defined by claim 8, wherein the resilient washer is retainably disposed within the cylindrical member.

10. The device defined by claim 8, wherein the dispersing wheel means comprises a wheel member defining an undersurface that tapers axisymmetrically to a central point, the point constructed and disposed to evenly split the jet of water and deflect it laterally and substantially uniformly over the undersurface of the wheel member.

11. The device defined by claim 10, wherein the wheel member is rotatable, and further comprising means for effecting rotation of the wheel member comprising a plurality of grooves formed in said undersurface each of which is angled slightly relative to a true radius of the wheel member, whereby water flowing through the grooves creates a tangential force component that rotates the wheel member.

12. The device defined by claim 11, wherein the rotation effecting means comprises two sets of said grooves that together generate a dual, concentric spray pattern.

13. The device defined by claim 12, wherein one set of grooves disperses water laterally outward and slightly upward relative to horizontal, and the other set of grooves disperses water laterally outward and slightly downward relative to horizontal.

14. The device defined by claim 13, wherein the two sets of grooves are disposed in alternating relation.

15. The device defined by claim 14, wherein:

(a) the entrance to each of the grooves is spaced from the point; and (b) further comprising a plurality of ribs extending between the point and the groove entrances, each of the ribs being angled relative to a true radius of the wheel member to assist in rotating the wheel member.

16. The device defined by claim 11, wherein:

(a) the entrance of each of the grooves is spaced from the point; and (b) further comprising a plurality of ribs extending between the point and the groove entrances, each of the ribs being angled relative to a true radius of the wheel member to assist in rotating the wheel member.

17. The device defined by claim 16, wherein the angle of the ribs relative to the wheel radius is greater than that of the grooves.

18. The device defined by claim 1, wherein the frame means rotatably carries the dispersing wheel means, and the dispersing wheel means comprises means for effecting its rotation upon impingement by the jet of water.

19. A spray head device for distributing a spray of water, comprising:

(a) housing means having an inlet adapted for connection to a source of water and an outlet constructed to issue an upwardly directed jet of water;

(b) frame means comprising opposed side member interconnected by top and bottom members and an intermediate cross arm, the housing means being carried between the cross arm and bottom member;

(c) and a water dispersing wheel rotatably carried by the top member of the frame means in overlying relation to the outlet in a position for impingement by the jet of water, the water dispersing wheel being movable between a first position in which the outlet is covered and a second position spaced from the outlet;

(d) the water dispersing wheel including means for effecting its rotation upon impingement by the water and for dispersing the water laterally outward into a circular spray pattern as the dispersing wheel is rotated.

20. The device defined by claim 19, wherein the opposed side members have inner longitudinal edges that taper to a point, whereby obstruction of the circular flow pattern is minimized.

21. The device defined by claim 19, wherein the water dispersing wheel is movable to the second position under the influence of the water jet, and is movable to the first position in the absence of the water jet under the influence of gravity.

22. The device defined by claim 19, wherein the water dispersing wheel comprises a rotatable shaft carried for sliding movement by the frame means between the first and second positions.

23. The deviced defined by claim 19, wherein the frame means is rotatable relative to the housing means, and further comprising means for selectively retaining the frame means in a specific position relative to the housing means.

24. The device defined by claim 19, wherein the water dispersing wheel defines an undersurface that tapers axisymmetrically to a central point, the point constructed and disposed to evenly split the jet of water and deflect it laterally and uniformly over the undersurface of the wheel member.

25. The device defined by claim 24, wherein the rotation effecting means comprises a plurality of grooves each of which is angled slightly relative to a true radius of the wheel member, whereby water flowing through the grooves creates a tangential force component that rotates the wheel member.

26. The device defined by claim 25, wherein the rotation effecting means comprises two sets of said grooves that together generate a dual, concentric spray pattern.

27. The device defined by claim 26, wherein one set of grooves disperses water laterally outward and slightly upward relative to horizontal, and the other set of grooves disperses water laterally outward and slightly downward relative to horizontal.

28. The device defined by claim 27, wherein the two sets of grooves are disposed in alternating relation.

29. The device defined by claim 28, wherein:

(a) the entrance to each of the grooves is spaced from the point; and (b) further comprising a plurality of ribs extending between the point and the groove entrances, each of the ribs being angled relative to a true radius of the wheel member to assist in rotating the wheel member.

30. The device defined by claim 29, wherein the angle of the ribs relative to the wheel radius is greater than that of the grooves.

31. A spray head device for distributing a spray of water, comprising:

(a) housing means having an inlet adapted for connection to a source of water and an outlet constructed to issue a jet of water;

(b) volume control means associated with the housing means for controlling the jet of water so that its volume output is substantially constant;

(c) frame means carried by the housing means;

(d) a dispersing wheel rotatably carried by the frame means in overlying relation to the outlet for impingement by the jet of water, the dispersing wheel defining an undersurface that tapers axisymmetrically toward the outlet to disperse the water outward into a circular spray pattern as the wheel rotates;

(e) the undersurface of the dispersing wheel defining first and second pluralities of grooves, each groove having an entrance spaced from said point and being angled slightly relative to a true radius of the wheel member, whereby water flowing through the grooves creates a tangential force component that rotates the wheel member, said first and second pluralities of grooves constructed and arranged to generate a dual, concentric spray pattern; and (f) a plurality of ribs extending between the point and the groove entrances, each of the ribs being angled relative to a true radius of the wheel member to assist in rotating the wheel member.

32. The device defined by claim 31, wherein one set of grooves disperses water laterally outward and slightly upward relative to horizontal, and the other set of grooves disperses water laterally outward and slightly downward relative to horizontal.

33. The device defined by claim 32, wherein the two sets of grooves are disposed in alternating relation.

34. The device defined by claim 31, wherein the angle of the ribs relative to the wheel radius is greater than that of the grooves.

35. A spray head device for distributing a spray of water, comprising:
  (a) housing means adapted for connection to a source of water, the housing means defining an outlet and constructed to issue a jet of water through the outlet;
  (b) volume control means associated with the housing means for controlling the jet of water so that its volume output is substantially constant;
  (c) dispersing wheel means disposed for impingement by the jet of water and constructed to disperse the water outward into a circular flow pattern;
  (d) frame means carried by the housing means for carrying the dispersing wheel means in overlying relation to the outlet;
  (e) the frame means being constructed for rotation relative to the housing means, and further comprising a plurality of radially extending grooves formed on one of said frame means and housing means, and a boss formed on the other of said frame means and housing means and disposed for detent engagement in said grooves.

36. The device defined by claim 35, wherein the grooves are disposed on the frame means and are V-shaped in cross-section, said boss having a cross-section corresponding to the grooves.

37. A spray head device for distributing a spray of water, comprising:
  (a) enclosed housing means defining an internal chamber, a fluid inlet adapted for connection to a source of water for receiving water into the chamber, and an outlet constructed and arranged to issue a jet of water therefrom;
  (b) volume control means disposed in the internal chamber for controlling the jet of water so that the volume output from the outlet is substantially constant;
  (c) means within the internal chamber defining a dead ended space disposed in communication with the inlet in which air may be caught to act as a shock absorbing cushion to incoming water;
  (d) dispersing wheel means disposed for impingement by the jet of water and constructed to disperse the water outward into a circular flow pattern;
  (e) frame means carried by the housing means for carrying the dispersing wheel means in overlying relation to the outlet;
  (f) the frame means comprising opposed side members interconnected to top and bottom members and an intermediate cross arm, the housing means being carried between the cross arm and bottom member, and the dispersing wheel means being rotatably carried by the top member;
  (g) the frame means being rotatable relative to the housing means, and further comprising means for selectively retaining the frame means in a specific position relative to the housing means.

38. A spray head device for distributing a spray of water, comprising:
  (a) enclosed housing means defining an internal chamber, a fluid inlet adapted for connection to a source of water for receiving water into the chamber, and an outlet constructed and arranged to issue a jet of water therefrom;
  (b) volume control means disposed to the internal chamber for controlling the jet of water so that the volume output from the outlet is substantially constant;
  (c) means within the internal chamber defining a dead ended space disposed in communication with the inlet in which air may be caught to act as a shock absorbing cushion to incoming water;
  (d) dispersing wheel means disposed for impingement by the jet of water and constructed to disperse the water outward into a circular flow pattern;
  (e) frame means carried by the housing means for carrying the dispersing wheel means in overlying relation to the outlet;
  (f) the frame means comprising opposed side members interconnected by a top member that carries the dispersing wheel means, the side members having inner longitudinal edges that taper to a point, whereby obstruction of the circular flow pattern is minimized;
  (g) the dispersing wheel means comprising
    (i) a rotatable wheel member defining an undersurface that tapers axisymmetrically to a central point;
    (ii) a plurality of grooves formed in the undersurface of the wheel member, each groove having an entrance spaced from said point and being angled slightly relative to a true radius of the wheel member so that water flowing through the groove creates a tangential force component that rotates the wheel member; and
    (iii) a plurality of ribs extending between the point and the groove entrances, each rib being angled relative to a true radius of the wheel member to assist in its rotation.

* * * * *

UNITED STATES PATENT AND TRADEMARK OFFICE
CERTIFICATE OF CORRECTION

PATENT NO. : 4,356,972
DATED : November 2, 1982
INVENTOR(S) : Merle A. Vikre

It is certified that error appears in the above—identified patent and that said Letters Patent is hereby corrected as shown below:

Column 7, line 61, the numeral "22c" should be changed to --22e--.

Column 9, line 24, the word "sidebyside" should be changed to --side-by-side--.

Column 11, line 51, the word "therwith" should be changed to --therewith--.

Column 13, line 28, the word "member" should be changed to --members--.

Column 13, line 57, the word "deviced" should be changed to --device--.

Signed and Sealed this

Twelfth Day of April 1983

[SEAL]

Attest:

Attesting Officer

GERALD J. MOSSINGHOFF

Commissioner of Patents and Trademarks